Dec. 23, 1930.  A. PENN  1,786,083
AUTOMATIC TEMPERATURE CONTROLLING DEVICE
Filed May 21, 1928
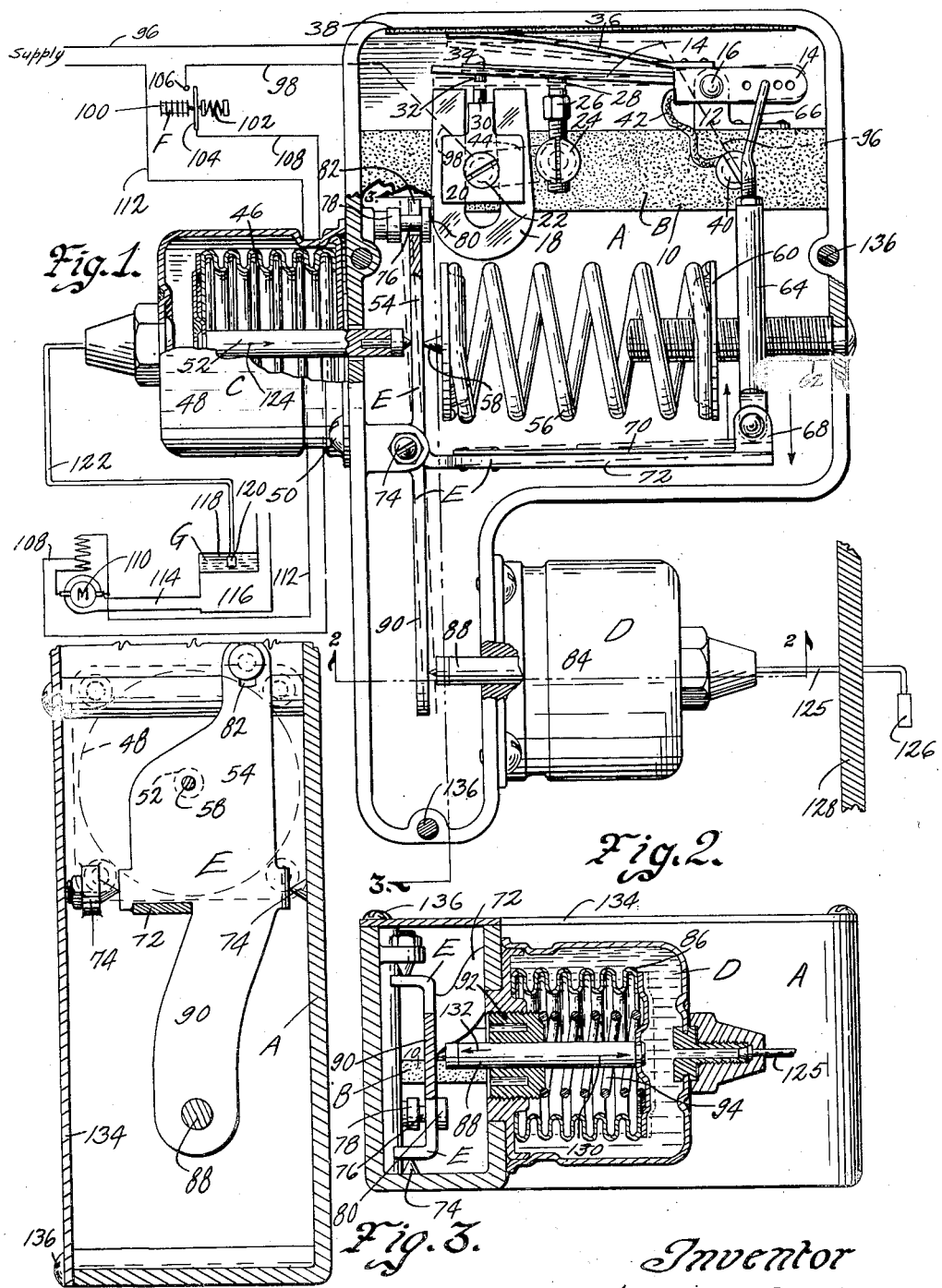

Patented Dec. 23, 1930

1,786,083

UNITED STATES PATENT OFFICE

ALBERT PENN, OF DES MOINES, IOWA, ASSIGNOR TO PENN ELECTRIC SWITCH CO., OF DES MOINES, IOWA, A CORPORATION OF IOWA

AUTOMATIC TEMPERATURE-CONTROLLING DEVICE

Application filed May 21, 1928. Serial No. 279,327.

The object of my invention is to provide an automatic temperature controlling device or switch adapted to be operated for making and breaking an electric circuit and at the same time to provide means which operate independent of the normal means for modifying the action of the normal means whereby the device may be controlled by two independent environments.

A further object is to provide such a device of simple, durable and comparatively inexpensive construction whereby it is practical for the objects contemplated.

Still a further object is to provide a switch mechanism wherein a temperature controlled element is used for imparting movement to a movable contact member for making and breaking an electric circuit, the connection between the temperature controlled element and the movable contact being one that allows for movement of the contact and temperature element either in unison or independent of each other and a separate temperature element in operative connection with the first one for modifying the action of the first one upon the movable contact whereby the device may be controlled relative to weather conditions.

It may be here mentioned that in switch mechanisms where an electric circuit is made or broken for stopping and starting a motor which in turn causes the operation of an oil burner or other type heating means, such switch is normally operated by means of elements which are responsive to changes in temperature to the end that when the temperature in a living room for instance, is too low, then the motor starts and when the temperature of the room is too high, then the motor stops.

However, when the room becomes cool enough so that the room thermostat closes the circuit, the motor of the heat producing device is immediately started and the boiler or furnace begins to send heat up to the room. This heat does not come up immediately due to the fact that the burner must burn awhile before the heat has started to circulate and when the room becomes warm enough for the room thermostat to operate for stopping the motor, considerable heat will have been generated in the furnace or boiler so that the heat will continue to come up and overheat the room. The result is that the room is either too warm or too cold and even when the room thermostat is set for the slightest possible differential of operation, this bad result is not eliminated.

It has therefore, been my object to provide a dual control in which the room thermostat is connected in series with an auxiliary controlling device actuated by the actual condition of the boiler or furnace itself. The result is that when the room thermostat calls for more heat, the furnace will be started and will immediately heat up. After it has heated for a short interval of time the auxiliary controlling device will shut off the motor of the burner so that what might be termed a "shot" of heat is sent up to the room from the furnace. After another interval of time if the room thermostat still calls for heat and the auxiliary controlling device has been actuated due to the cooling off of the furnace for again establishing the electric circuit, another "shot" of heat is sent up to the room.

This continues until the room is sufficiently warm to open the circuit through the room thermostat after which even though the auxiliary controlling device calls for more heat, no more will be sent up until the room thermostat has again indicated the minimum room temperature for which it is set.

Even in this construction I find a drawback because of the auxiliary controlling device having to be adjusted for greater heat during cold weather. This adjustment would ordinarily have to be made by hand unless a way is provided for taking care of it.

In my improved controlling device I have made a provision for proper operation of the device during all conditions of weather.

Another object therefore has been to provide a temperature controlled means associated with the auxiliary controlling device for modifying the action of it depending on weather conditions.

Still another object is to provide a spring connection between the movable contact member of the switch and the temperature controlled element which spring is in engagement with the element so that it will yield somewhat when the circuit is broken and thereby allow a snap action of the switch even though the temperature controlled element is moving imperceptibly.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a diagrammatic view of a heat producing device included in the circuit of a room thermostat, my automatic temperature controlling device in enlarged form being shown in connection therewith.

Figure 2 is a sectional view on the line 2—2 of Figure 1 illustrating the construction of the temperature controlling means actuated according to the weather; and Figure 3 is a sectional view on the line 3—3 of Figure 1 illustrating an arm which is adapted by the temperature actuated means to be moved.

In the accompanying drawings I have used the reference character A to indicate generally a casing in which the parts of my auxiliary controlling device are mounted. In connection with the casing A, I provide a switch structure indicated generally by the reference character B, a controlling device C and a second controlling device D.

The switch structure B comprises a bar 10 of insulation adapted to support the various parts of the switch. A bracket 12 is secured to the bar 10 and pivotally supports a switch arm 14. The connection between the bracket 12 and the arm 14 is by means of a rivet or the like 16.

Mounted on the bar 10 is a permanent magnet 18. The magnet 18 is held in position by a clip 20 and a terminal screw 22. Supported on the bar 10 is a post 24 in which is adjustably mounted a main fixed contact 26. A main movable contact 28 is mounted on the arm 14 for engagement with the contact 26 when the arm is in one of its positions.

An auxiliary fixed contact 30 is mounted on the clip 20 and is adapted to cooperate with an auxiliary movable contact 32. The contact 32 is secured to a leaf spring 34 which has its opposite end secured to the switch arm 14. The contact 32 extends through an enlarged opening in the arm 14 whereby the contact 32 is movable relative to the arm 14. A leaf spring 36 is secured to the arm 14 to act as a resilient stop for the arm. A strip of insulation 38 is secured to the inside of the casing A to prevent grounding of a switch arm 14 when the spring 36 is moved outwardly.

A terminal bolt 40 is mounted on the bar 10 and is connected by a flexible wire 42 to the armature arm 14. A strip of metal 44 connects the two bolts 22 and 24 together whereby an electrical connection is established between them. The bolts 24 and 40 serve as terminal bolts for connecting the device in an electric circuit.

A switch structure B when made as illustrated and described has a snap action for quickly opening and closing the electric circuit. This action occurs because of the switch arm 14 being made of iron whereby it is attracted by the magnet 18.

Whenever the arm 14 is moved close enough to the magnet 18 for the arm to be influenced by the magnetic field, the arm will be drawn toward the magnet and as it moves it will be in an ever increasing strength of magnetic field which serves to quickly close the contacts. First the auxiliary contacts 30 and 32 will be closed and then the main contacts 26 and 28 which carry the greatest portion of the current.

Upon movement of the arm 14 in the opposite direction and after the arm starts to move, it will be immediately in a weaker magnetic field which tends to allow it to move still further for quickly opening the contacts. First the main contacts will be opened and then the auxiliary contacts whereby the final opening occurs between the auxiliary contacts. Any tendency of the auxiliary contacts to arc will be minimized by the quick action of the switch arm and by the contacts being separated in a strong magnetic field which immediately blows out the arc.

For actuating the switch structure B, I provide a means C comprising a bellows 46 included in a housing 48. The housing 48 is connected to the casing A by screws 50. The bellows 46 is sealed relative to the casing 48 so that a medium can be placed in the space between the bellows and the casing and may be utilized for collapsing or expanding the bellows.

Attached to the head of the bellows 46 is a pin 52. The pin 52 is sharpened on its free end and contacts with an arm 54 of a bell crank lever E. Mounted in opposition to the bellows 46 is a spring 56. The spring 56 is provided with a sharpened point 58 contacting with the arm 54 of the bell crank and has a screw threaded washer 60 associated with a threaded rod 62. This construction allows adjustment of the tension of the spring 56.

The switch structure B is operatively connected to the bell crank lever E by a link 64. One end of the link 64 consists of a rod 66 adjustably mounted relative to the link 64 and pivotally connected with the switch arm 14. The other end of the link 64 is pivoted to ears 68 extending from a leaf spring 70. The spring leaf 70 has one end secured to an arm 72 of the bell crank lever E. The bell crank lever E is pivoted at 74 to pivot points extending from the casing A.

A stop is provided for the bell crank E when moving in either direction. This stop consists of a pin 76 having flanges 78 and 80 adapted to engage the surfaces of the arm 54. The pin 76 itself extends through a slot 82 formed in the arm 54.

For modifying the action of the controlling means C, I provide the controlling means D comprising a casing 84 having a bellows element 86 mounted therein. The element 86 is sealed relative to the casing in a manner similar to the construction of the controlling means C and the head of the bellows is provided with a pin 88 adapted to coact with an arm 90 of the bell crank lever E for actuating the bell crank.

For adjusting the controlling means D, I provide a threaded bushing 92 in the base of the controlling means D. Interposed between the bushing 92 and the head of the bellows 86 is a spring 94.

Practical operation

In the operation of my device the switch structure B is included in an electric circuit consisting of a wire 96 extending from a source of supply. A wire 98 extends from the switch structure B to a room thermostat F which is located in, for instance, a living room. The thermostat F is of the ordinary construction and may comprise a bellows element 100 opposed by an adjustable spring 102 and acting upon a pivoted switch arm 104. The switch arm 104 in connection with a contact 106, serves as a switch to be actuated by the temperature in the room.

From the room thermostat, a wire 108 extends to a motor 110. A return wire 112 completes the circuit through the room thermostat of my controlling device and the motor 110 back to the source of supply.

I have illustrated the motor 110 as being on the blower of an oil burner for forcing air through the tube 114 into the combustion chamber 116 of a furnace or boiler G. I have indicated the water container of the boiler by the reference numeral 118. In order to operatively connect my automatic controlling device with the water container 118, I provide a controlling container 120 inserted in the water container 118 and connected by a tube 122 to the controlling means C.

From the foregoing construction, it will be obvious that the motor 110 will operate only when the room thermostat F and the switch structure B are in position for closing the circuit through the motor. Therefore, when the thermostat F calls for more heat, the motor 110 will be operated for furnishing this heat. The water in the container 118 however, will soon heat up and act upon the liquid or gas in the controlling container 120 for moving the pin 52 in the direction of the arrow 124. This serves to open the switch as shown in full lines in Figure 1.

It is, therefore, obvious that the heat in the boiler G will not become excessive and tend to overheat the room. The boiler G will soon cool down so that the switch B will again be closed for establishing the circuit through the motor 110, providing the thermostat F still calls for more heat in the room. Thus the objection of getting the boiler too hot so that it will send up too much heat even if the motor 110 is stopped is entirely eliminated by the use of my auxiliary controlling structure.

It will be obvious that in steam boiler installations instead of hot water installations, the pressure of the steam will act upon the bellows 46. In hot air furnaces the element 120 may be mounted in the air circulation pipes adjacent the furnace for controlling the switch B. Instead of the motor 110 as used in oil burning installations, damper controlling devices may be used for accomplishing the same purpose. In this manner my device can be adapted for use in coal burning installations.

I have found one objection of the foregoing described device and this objection lies in the fact that during cold weather it is necessary to keep the water in the container 118 at a higher temperature in order to keep the room warm or in other words, it is necessary to allow the water in the container 118 to raise to a higher temperature before shutting off the switch structure B. This can be accomplished by adjusting the spring 56 according to weather conditions but such adjustment must be made manually and it is obvious that it would be a source of considerable inconvenience especially when even in one day the temperature of the outside atmosphere may vary considerably.

I have, therefore, provided the controlling means D having a controlling container 126 mounted outside of the building in which the device is installed. The building wall is indicated by the reference numeral 128.

During cold weather the bellows 86 will allow the spring 94 to move the pin 88 in the direction of the arrow 130 and thereby allowing the spring 56 to exert a greater tension on the bell crank lever E so that it will require a greater temperature of the water in a hot water system or greater pressure in a steam heating plant in the boiler G to overcome the spring 56 sufficiently to open the switch B.

In extremely cold weather the pin 88 might entirely leave the arm 90 of the bell crank and thereby allow the full force of the spring 56 to operate upon the bell crank.

When the weather again becomes warm, the liquid or gas in the casing 84 will act upon the bellows 86 for causing the pin 88 to move in the direction of the arrow 132 for assisting the controlling means C against the opposition of the spring 56. In this manner it takes less heat in the boiler G to open the switch B so that the temperature of the water will be maintained at the proper point depending upon weather conditions.

The proportions of the bell crank E may be varied and the tensions of the springs 56 and 94 may also be varied for causing the bellows 86 to be actuated in exact proportions to weather conditions so that the temperature of the room may be maintained at an even heat regardless of whether the weather is severe or whether it is very mild.

My device when once set for operation requires no further attention everything being automatically regulated according to room, boiler and weather conditions.

The controlling container 126 is operatively connected to the bellows 86 by a pipe 125. The casing A may be closed by a cover member 134 held in position by screws 136 so that dust can be excluded from the working parts within the casing.

By making the switch structure B with the magnet as shown, a snap action switch is provided which I have found is efficient for the purpose of controlling the entire current for the motor without the necessity of providing a pilot or relay circuit. This is a valuable feature as it simplifies the mechanism and installation problem considerably.

Some changes such as a different type of switch or different actuating devices for the switch, may be made in the construction and arrangement of the parts of my device without departing from the real spirit and purpose of my invention, whereby the heat producing device is controlled by a plurality of conditions of different characters and it is my intention to cover by my claims, any modified forms of structure or use of mechanical equivalents, which may be reasonably included within their scope.

I claim as my invention:

1. In a device of the class described, a casing, a control arm therein, means for pivoting said control arm with respect to said casing and intermediate the ends of the control arm, a pair of temperature responsive means on opposite sides of both the control arm and the pivoting means, said temperature responsive means being responsive to temperature changes within a heat producing device and of outside atmosphere respectively.

2. In a device of the class described, a casing, a control arm therein, means for pivoting said control arm with respect to said casing and intermediate the ends of the control arm, a pair of temperature responsive means on opposite sides of both the control arm and the pivoting means, said temperature responsive means being responsive to temperature changes within a heat producing device and of outside atmosphere respectively and a control switch connected with said control arm and operable to control the operation of said heat producing device.

Des Moines, Iowa, January 9, 1928.

ALBERT PENN.